United States Patent [19]

Otto et al.

[11] Patent Number: 4,649,955
[45] Date of Patent: Mar. 17, 1987

[54] PULSED GAS SUPPLY

[75] Inventors: William F. Otto; Andrews H. Jenkins; Thomas G. Roberts, all of Huntsville; Thomas E. Honeycutt, Somerville, all of Ala.

[73] Assignee: The United States of America as represented by the Secretary of the Army, Washington, D.C.

[21] Appl. No.: 789,859

[22] Filed: Oct. 21, 1985

[51] Int. Cl.⁴ ............................................. F16K 11/06
[52] U.S. Cl. ............................ 137/624.13; 137/625.32
[58] Field of Search ...................... 137/624.13, 624.15, 137/624.14, 625.32

[56] References Cited

U.S. PATENT DOCUMENTS 2,518,003 8/1950 Goddard ................... 137/624.14 X
3,937,252 2/1976 Ishida ............................. 137/624.13
4,546,795 10/1985 Okamoto ........................ 137/624.15

FOREIGN PATENT DOCUMENTS 17452 5/1971 Japan .............................. 137/625.32

Primary Examiner—Alan Cohan
Attorney, Agent, or Firm—John C. Garvin, Jr.; Freddie M. Bush; Harold W. Hilton

[57] ABSTRACT

The pulsed gas supply consists of a cylindrical gas reservoir which contains a multiplicity of small release ports in a helical pattern and an inner cylindrical rotary valve which also contains a multiplicity of small release ports in the same helical pattern. The reservoir and valve constitute an integral unit which has the advantage of totally balanced forces on a single moving part. This allows for motion free of friction caused by the high pressures of the gas supply.

1 Claim, 4 Drawing Figures

PULSED GAS SUPPLY

DEDICATORY CLAUSE

The invention described herein may be manufactured, used, and licensed by or for the Government for governmental purposes without the payment to us of any royalties thereon.

BACKGROUND OF THE INVENTION

Pulsed gas supplies are required for many purposes in plasma physics, laser physics, and other fields. The need for fast-acting valves that can supply large volumes of gas repetitively is increasing especially in the development of pulsed chemical and pulsed chemical transfer lasers. Also, it has recently been realized that part of the effects created when a high energy pulsed laser beam strikes a surface can be simulated if a fast-acting repetitively-pulsed gas supply is developed for this purpose. The portion of the effects that is simulated is that of the development of a low-density bubble of gas near the surface. The gas is primarily heated air but it may also contain gases from material vaporized from the surface or from paint if the surface was painted. These low density gases may expand into or be ingested by the system of which the surface was a part, possibly causing some change in the system's operating characteristics. It is desirable to simulate this effect of a laser without using a laser. The simulator makes testing possible at locations where lasers are not available, and it makes it possible to simulate the effects that would be produced by lasers with outputs larger than existing lasers can produce. The essential part of such a simulator is a fast acting valve capable of repetitively releasing pulses of low density gas. However, a check of the commercially available valves showed that none could meet the high flow rates and fast opening and closing requirements necessary to simulate the effects produced by high energy pulsed lasers such as the high pressure electric discharge $CO_2$ lasers, the high energy pulsed chemical lasers, and the high energy pulsed Excimer lasers. To meet these requirements, a new approach to this technology is required. Therefore, a compact design that has the advantage of totally balanced forces on a single moving part has been conceived, fabricated, tested and used with success in a laser-effect simulator where the effects of low density is being simulated.

It is an objective of this disclosure to provide a fast acting valve which, along with the gas reservoir, forms an integral unit that is a pulsed gas supply. It is also an object of this disclosure to provide a pulsed gas supply that may be used to meet the gas supply requirements of pulsed chemical and pulsed chemical transfer lasers.

DESCRIPTION OF THE PREFERRED EMBODIMENT

Figure 1:
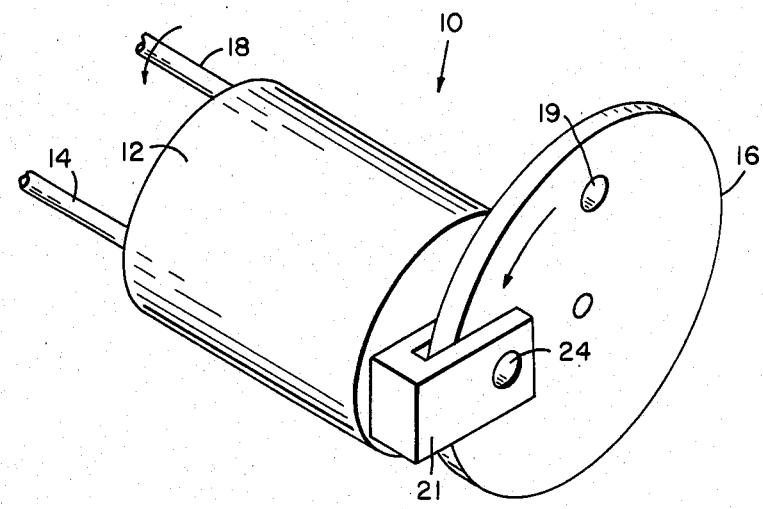
FIG. 1 is a diagrammatic illustration of a typical pulsed gas supply valve.

Referring to the drawings, FIG. 1 illustrates a typical pulsed gas valve assembly 10 including a gas reservoir 12 having a gas inlet 14 to direct gas into the reservoir. A rotating disc 16 is rotatably mounted in a shaft 18 and includes a single hole 19. A valve port assembly 21 is secured to the reservoir and includes a release port in the reservoir (not shown) and a release port 24 in the valve port assembly 21. When the hole 19 comes into alignment with the mating release port a pulse of gas is released. Here the forces are unbalanced and the heavy pressure loading on the rotating disc causes excessive friction and severe design problems. Also, to obtain the desired gas flow, the hole in the rotating disc and in the release port have to be so large that rapid opening and closing cannot be obtained. This also tends to make the disc very large in the application of interest here, which makes large pulsed repetition frequencies difficult to obtain.

Figure 2:
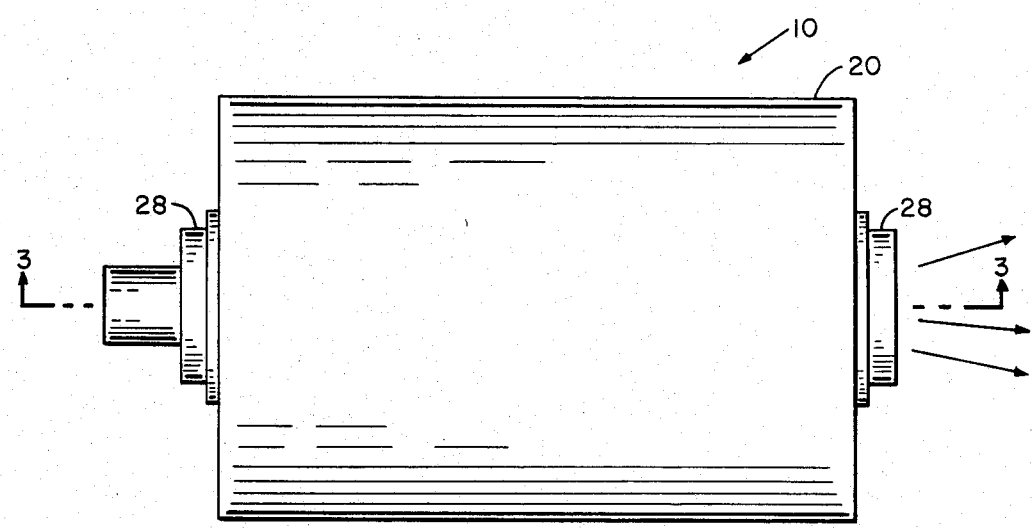
FIG. 2 is an elevational view of a pulsed gas supply assembly as provided by this disclosure.
Figure 3:
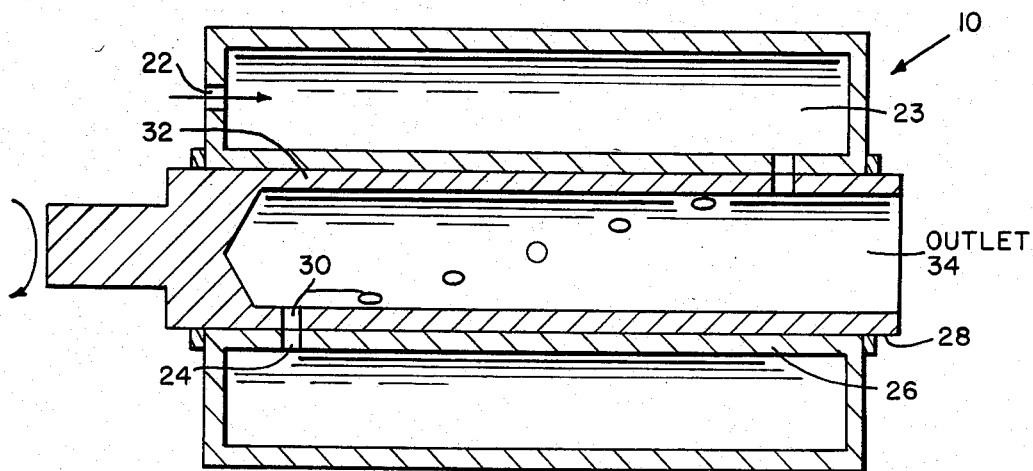
FIG. 3 is a sectional view showing a cross-section along line 3—3 of FIG. 2.

FIGS. 2 and 3 illustrate the pulsed gas valve assembly 10 of the present invention. The pulsed gas valve assembly 10 includes a gas reservoir 20 having an inlet 22 connected to a source of gas (FIG. 3) and to the interior 23 of the annular gas reservoir 20. To direct gas out of reservoir 20, a plurality of release ports 24 are disposed around the periphery of the inner annular surface 26 of reservoir 20. A second annular member or canister 28 is concentrically mounted in reservoir 20 for rotation therein. A plurality of holes 30 are provided in the outer annular surface 32 of canister 28 for alignment with release ports 24 of reservoir 20. Canister 28 includes an outlet 34 for release of the gas. The release ports 24 and holes 30 are in a helical pattern (FIG. 3) so that they all open (aligned) simultaneously and close nonaligned simutaneously. The holes and release ports are made small enough so that they open and close as quickly as desired. The shorter the desired pulses, the smaller the holes. Once the hole size has been determined, the number of holes and release ports are determined by the range of flow rates to be simulated. The gas flow rate is varied by varying the gas pressure in the reservoir and the pulse repetition frequency is varied by varying the speed with which the inner cylindrical rotary valve is rotated. Note that the symmetry of this design is such that the forces produced by the high gas pressures in the reservoir are balanced in such a manner that they do not cause friction to be produced by the rotating member 28.

In operation, the outlet 34 is positioned near the surface where the effect is to be simulated. Gas is admitted to the reservoir 20 through port 22 until the desired pressure is obtained, and canister 28 is rotated at a speed necessary to produce the required pulse repetition frequency.

Specifications of the pulsed gas supply which was built and tested are: Short pulses of helium gas at rates up to 30 pulses per second with volumes in each pulse being controllable up to 3.0 liters (STP). The ratio of opened time to closed time is not to exceed 5 percent and the maximum required gas pressure is not to exceed 1000 psi. The average flow rate is to be 90 liters per second and the peak flow rate is to be 1800 liters per second which gives the above 5 percent duty cycle. Because the line connecting the valve to the gas reservoir must be able to handle the peak flow rate of 1800 liters per second and, therefore, must be quite large, it was decided to make the reservoir and valve one integral unit. The amount of gas that flows through a release port per unit time is given by VA, where is the density, V is the velocity of the gas, and A is the cross-sectional area of the release port. The reservoir is sized to deliver the required gas flow rates without experiencing excessive pressure drops, so that the reservoir is replenished during the time between pulses.

With those constraints in mind, a computer code was written to calculate the number and diameter of the valve release ports, the size of the valve and reservoir, and the anticipated performance of the pulsed gas supply. The leakage inherent in this sleeve valve design was not included in the calculations. A leakage rate as high as 10 percent of the average flow rate could be tolerated in this application without detrimental results, and reasonable attention to machining tolerances resulted in a leakage rate substantially lower than 10 percent. To calculate the expected performance of the pulsed gas supply, the following inputs are made to the program: (1) the number of valve release ports, (2) the diameter of the release ports, (3) the diameter of the sleeve, (4) the volume of the reservoir, (5) the gas supply pressure, (6) the diameter of the supply port into the reservoir, and (6) the valve rotation speed. The inputs are varied until the desired operating characteristics are obtained.

Figure 4:
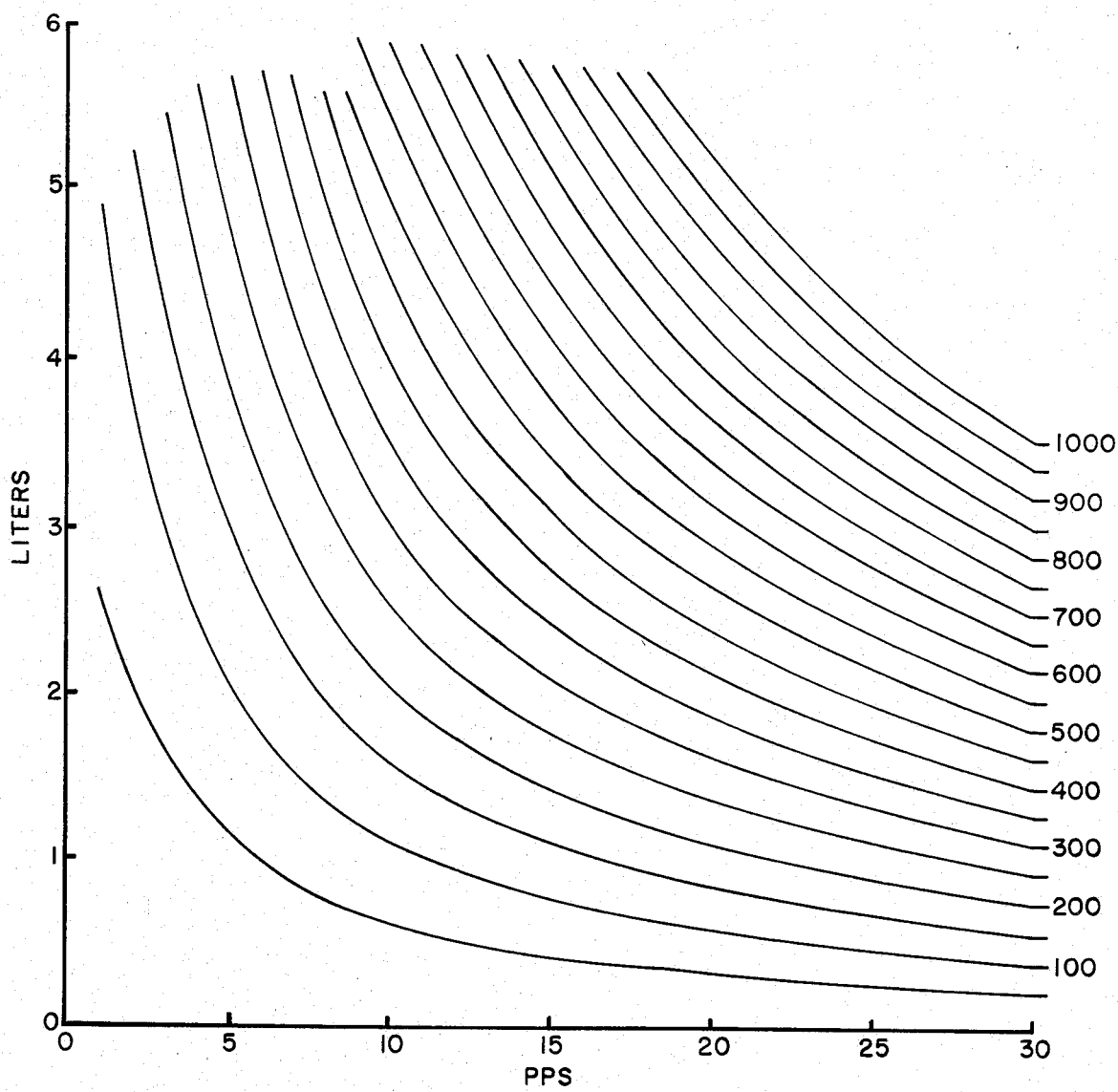
FIG. 4 is a schematic illustration of the variation of the gas volume with the valve speed and the gas supply pressure.

FIG. 4 gives a set of curves for the gas volume supplied as a function of the valve speed with the supply pressure as a parameter. FIG. 4 is used to determine the required supply pressure once the desired gas volume and pulse rate has been set. It may also be seen from FIG. 4 that the gas volume delivered at a set pulse rate may be varied by changing the gas supply pressure.

The final design resulted in a 1-inch sleeve valve rotor with a 0.75-inch inner diameter. The rotor contained thirty 0.080-inch diameter holes arranged in a helical pattern. Each hole advances 60 degrees on the rotor so 30 holes results in five turns on the helix. The volume of the reservoir is 0.55 liters and a pressure drop of 25 psi occurs for each liter of helium discharged. The reservoir was safely tested to 2000 psi but was not operated in excess of 1000 psi. When 3 liters are discharged at 30 pulses per second, the required gas supply pressure was 850 psi. Measurement of reservoir pressure history for various pulse rates and supply pressures were within 10 percent of the predicted values.

In fabrication, the reservoir was made from stainless steel and the 30 holes were drilled before making the finished hone on the running surface to eliminate drill burrs from this critical surface. The sleeve valve rotor was turned from brass stock with a succession of cuts being made, while readjusting the lathe tail stock, to reduce the taper to less than 0.0001 inches. The holes in the brass rotor were then match drilled inplace in the stainless steel honed base. This procedure reduced the leakage to a very acceptable level from the system point of view. However, the driving torque which was expected to be minimal due to the balanced force design were observed to increase very noticably at the highest gas pressures used. The most probable cause of this effect is believed to be the leakage flow conditions in the lubricant. At low gas pressures, the lubricant flow is laminar and little torque is required, as anticipated. But when the gas pressure is high, the lubricant flow becomes turbulent with an attendant increase in driving torque. Thus, the leakage, though low from the system viewpoint, is dominating at the lubricant viewpoint. Because of this, the valve requires a controllable constant speed drive for satisfactory operation.

It should be obvious to those skilled in the art that the design could be readily modified to obtain larger pulses rates, larger flow rates, or lower leakage rates; for example: two sets of matched holes could be drilled in the rotor to double the pulse rate. This would require the size of the reservoir and the size of the supply to the reservoir to be increased. Also, two sets of matched holes could be drilled in both the rotor and the reservoir. This would double the flow rate at a given supply pressure and also double the pulse rate or it would allow for the gas supply pressure to be decreased for a given flow rate which would decrease the leakage rate and required torque. The intent of this disclosure is to include these emodiments and other embodiments than can reasonably be expected to follow by modifications made by one skilled in the art.

We claim:

1. A pulsed gas supply valve assembly comprising:
   a. a toroidal member forming a reservoir and having an inlet connected to a gas source;
   b. a canister rotatably mounted in said toroidal member and defining an outlet means integrally formed with said reservoir to direct gas therefrom in a pulsed mode;
   c. said reservoir provided with an interior wall having a plurality of release ports therein, and said rotatable canister having a plurality of openings communicating into the interior thereof, said release ports and said openings disposed for aligned relation responsive to rotation of said canister;
   d. an outlet disposed in said canister to direct said pulsed gas to a target; and,
   e. said release ports in said toroidal member of said openings in said canister being arranged along the length of the inner and outer peripheral surfaces, respectively, thereof in a helical pattern.

* * * * *